(12) United States Patent
Zehler et al.

(10) Patent No.: US 10,021,109 B2
(45) Date of Patent: Jul. 10, 2018

(54) SYSTEM AND METHOD FOR AUTOMATICALLY PROVIDING PROXIMITY BASED GUEST ACCESS TO A NETWORK OF RESOURCE DEVICES

(71) Applicant: Xerox Corporation, Norwalk, CT (US)

(72) Inventors: Peter J. Zehler, Penfield, NY (US); Emil Macarie, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 345 days.

(21) Appl. No.: 15/051,926

(22) Filed: Feb. 24, 2016

(65) Prior Publication Data

US 2017/0244722 A1 Aug. 24, 2017

(51) Int. Cl.
| | |
|---|---|
| *G06F 7/04* | (2006.01) |
| *H04L 29/06* | (2006.01) |
| *H04W 12/04* | (2009.01) |
| *H04W 12/06* | (2009.01) |
| *H04W 12/08* | (2009.01) |

(52) U.S. Cl.
CPC ............ *H04L 63/107* (2013.01); *H04L 63/06* (2013.01); *H04L 63/068* (2013.01); *H04L 63/08* (2013.01); *H04W 12/04* (2013.01); *H04W 12/06* (2013.01); *H04W 12/08* (2013.01)

(58) Field of Classification Search
CPC ....... H04W 4/008; H04W 4/80; H04W 76/11; H04W 76/14; Y02D 70/00; Y02D 70/1262; Y02D 70/164; Y02D 70/26
See application file for complete search history.

(56) References Cited

U.S. PATENT DOCUMENTS

| | | | |
|---|---|---|---|
| 7,958,562 B2 | 6/2011 | Gaucas | |
| 2014/0073338 A1* | 3/2014 | Lioulis | H04W 72/0446 455/452.1 |
| 2015/0120934 A1* | 4/2015 | Wei | H04L 47/70 709/226 |
| 2015/0141021 A1* | 5/2015 | Kapoulas | H04W 36/32 455/441 |

* cited by examiner

*Primary Examiner* — Abiy Getachew
(74) *Attorney, Agent, or Firm* — Fox Rothschild LLP (57) ABSTRACT

A method for providing guest access to a guest user for a network resource device based on proximity includes provisioning a plurality of network resource devices with a set of guest-on boarding information, receiving a request for guest access from a guest user for the network resource devices, determining if the guest user is within a certain distance of at least one of the network resource devices, and if the guest user is within the certain distance of at least one of the network resource devices identify each such network resource device as a proximate device. The method also includes providing a first set of guest on-boarding information to the guest user, via one of the proximate devices. The first set of guest on-boarding information includes a first unique identifier, and guest access credentials are provided to the guest user upon receipt of the first unique identifier.

28 Claims, 3 Drawing Sheets

SYSTEM AND METHOD FOR AUTOMATICALLY PROVIDING PROXIMITY BASED GUEST ACCESS TO A NETWORK OF RESOURCE DEVICES

BACKGROUND

Often, enterprises serve as hosts to guests, for example, vendors, partners, clients, members, colleagues, and students for any of a variety of purposes. These guests may desire to access resource devices (such as print devices) on the host enterprise networks using their electronic devices, such as, for example, desktop computers, laptop computers, notebook computers, smartphones, and personal digital assistance (PDAs). However, the host network may prevent unauthorized access to a network resource. Moreover, even with access to the host network certain resource devices may prevent unauthorized access. Thus, host enterprises often provide guests temporary authorized access to network resource devices through the administrative service responsible for the resource device.

Providing guests access to network resource devices often requires the use of dedicated hardware and/or software, and the installment and the maintenance of the same, particularly because of network security features. These dedicated solutions are not simple, and often have requirements to ensure that those using publicly provided resource devices are those that have permission to do so. It is common for the solutions to require information technology (IT) support and/or the assistance of one or more administrators. For example, when a guest visits a new location with a Wi-Fi network and resource devices (e.g., printers), a common method of authentication is for an administrator to add the guest to the enterprise network containing the resource device and provide temporary access credentials. However, often times granting access to an enterprise network may not necessarily grant access to a resource device on that network. Alternatively, access to the enterprise network may not be required to be granted access to a resource device (for example, when services offered to the resource device can be made available through a public network).

The current disclosure discloses a system and method to automatically provide guest access credentials to a collection of resource devices based on proximity.

SUMMARY

In an embodiment, a system (and method) for providing guest access credentials to a guest user for a network resource device based on proximity may include a plurality of network resource devices, and a processor in communication with the plurality of network resource devices. The system may also include a computer-readable medium containing programming instructions that, when executed by the processor, cause the processor to provision each of the network resource devices with at least one set of guest-on boarding information, receive a request for guest access from a guest user (who does not have access to the one or more of the network resource devices at a time of the request) for one or more of the network resource devices, and determine if the guest user is within a certain distance of at least one of the network resource devices. If the guest user is within the certain distance of at least one of the network resource devices, the system may identify each such network resource device as a proximate device. Each set of guest on-boarding information may include a unique identifier and a domain address. The system may provide a first set of guest on-boarding information, via at least one of the proximate devices, to the guest user. The first set of guest on-boarding information includes a first unique identifier, and the system may provide guest access credentials to the guest user upon receipt of the first unique identifier from the guest user. At least one of the network resource devices is a print device.

In an embodiment, the system may receive the guest access credentials from the guest user, provide guest access to the guest user for one of the proximate devices that is also a print device, receive a print document from the guest user, and release the print document for printing at the proximate device that is also a print device.

In at least one embodiment, the system may determine if the guest user is within a certain distance of at least one of the network resource devices by establishing a short range communications link between an electronic device of the guest user and the at least one network resource device, and determining if a signal strength of the short range communications link is above a threshold level to determine that the guest user is within the certain distance of at least one of the network resource devices. The short range communications link may include a near-field communications link, a Bluetooth Low Energy link, or a radio-frequency identification link.

Alternatively and/or additionally, the system may determine if the guest user is within a certain distance of at least one of the network by displaying information on a display interface of the at least one network resource device. The displayed information may include a set of instructions for the guest user to perform a task, and the system may determine that the guest user is within the certain distance of the at least one network resource device if the guest user accurately performs the task. The set of instructions may include the first set of guest on-boarding information.

Optionally, the system may determine if the guest user is within a certain distance of at least one of the plurality of network resource devices by determining if the request for guest access from the guest user was received via a user interface of the at least one network resource device, wherein use of the user interface requires physical proximity of the guest user.

In an embodiment, the first unique identifier may include information relating to a guest access policy. The system may provide guest access credentials to the guest user to configure the guest access credentials based on the guest access policy. A guest access policy may include one or more of the following: a lifetime of the guest access credentials, a maximum number of document processing jobs allowed, one or more types of the network resource devices that the guest user can access, identities of the network resource devices that the guest user may be authorized access, or one or more capabilities of the network resource devices that the guest user may be authorized to access.

In another embodiment, the first unique identifier may include information relating to a time of transmission of the first set of guest on-boarding information to the guest user. The system may extract the time of transmission of the first set of guest on-boarding information to the guest user from the first unique identifier received from the guest user, determine a time difference between the time of transmission of the first set of guest on-boarding information to the guest user and a time of receipt of the first unique identifier received from the guest user, and deny the request for guest access credentials if the time difference is greater than a threshold value.

In an embodiment, the system may further authenticate the first unique identifier received from the guest user by determining that the first unique identifier matches a unique identifier provisioned to the plurality of resource devices.

In some embodiments, the first set of guest on-boarding information may also include a domain address, and the system may receive the first unique identifier from the guest user at the domain address.

In an embodiment, the system may receive the request for guest access from an electronic device of the guest user. In another embodiment, the system may provide guest access credentials to an electronic device of the guest user.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

An "electronic device" or a "computing device" refers to a device that includes a processor and a non-transitory, computer-readable medium (i.e., memory). The memory may contain programming instructions that, when executed by the processor, cause the electronic device to perform one or more operations according to the programming instructions. An electronic device also may include additional components such as a touch-sensitive display device that serves as a user interface, as well as a camera or other image capturing device. An electronic device may include one or more communication hardware components such as a transmitter and/or receiver that will enable the device to send and/or receive communications to and/or from other devices, whether via a communications network or via near-field or short-range communication protocols. As used in this description, a "computing device" or "electronic device" may be a single device, or any number of devices having one or more processors that communicate with each other and share data and/or instructions. Examples of electronic devices include, without limitation, mobile devices, smartphones, smart watches, digital cameras, tablet computing devices, electronic readers, personal computers, fitness tracking devices, wearable electronic devices, wearable electronic devices, media players, satellite navigation devices and the like.

A "mobile device" or "mobile electronic device" refers to a portable computing device. A mobile device may include a short range wireless communication interface such as a transmitter, a near field communication (NFC) or radio frequency identifier (RFID) tag or Bluetooth Low Energy (BLE) receiver (with reduced transmit power), a processor and non-transitory, computer-readable memory. The memory may contain programming instructions in the form of a software application that, when executed by the processor, cause the device to perform one or more document operations. Examples of suitable portable electronic devices include smartphones, personal digital assistants, cameras, tablet devices, electronic readers, personal computers, media players, satellite navigation devices and the like.

A "network resource device" or "resource device", as used herein, refers to an electronic device that performs one or more document processing functions such as, without limitation, printing, copying, facsimile transmitting or receiving, scanning, or performing other actions on document-based data. A "print device" is an example resource device.

A "print device" refers to a device that includes a print engine for printing a document. The print device may also include a wireless communication interface (such as a transmitter, an NFC interface, an RFID tag or a BLE receiver) used to communicate with one or more other devices, a processor that can process the document and a memory unit for storage of the documents or portions of the document. Any suitable print device can be used including, but not limited to, inkjet and laser print devices, copiers, multifunction devices, and the like.

The term "document" refers to electronic data, information, or other content. A document may include a text file, a Web page, a newsgroup posting, a picture, media, hyperlinks, a graphic, an image, and/or the like. The document may, for example, include several areas of text, and other areas of images or graphics. The text, for example, may include narrative sections of some length, as well as titles and captions.

The term "guest access" refers to providing temporary access to a guest user to one or more resource devices on a network who is not registered to use such resource devices.

Figure 1:
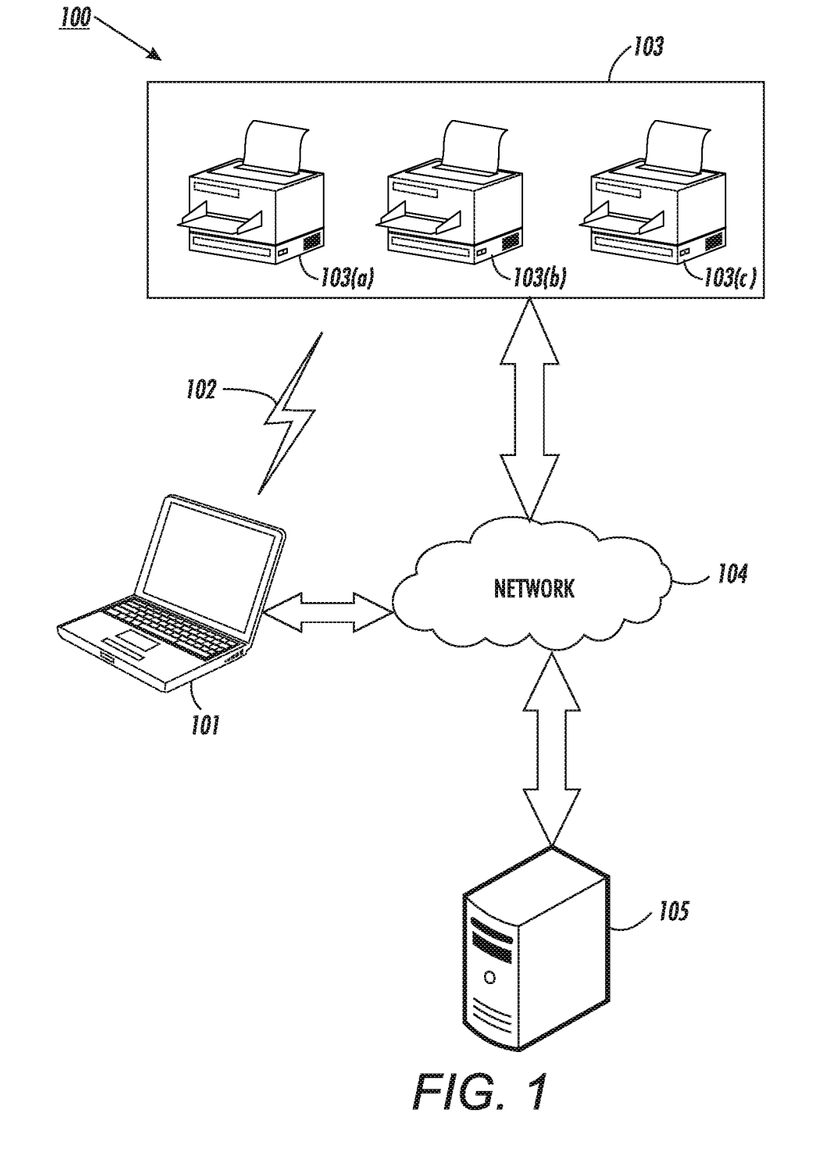
FIG. 1 is a schematic illustration of an example system for providing guest access to one or more network resource devices, according to an embodiment.

FIG. 1 shows an example system 100 for automatically granting to a guest user, guest access to a user to one or more network resource devices 103. The network resource devices may include any number of resource devices such as print devices (103a, 103b, 103c, and so on) or other network resource devices such as multifunction devices (not shown here) coupled electronically over one or more networks 104. A network 104 may include connections such as, for example, wire, wireless communication links, or fiber optic cables, and may provide any suitable medium of communication such as WiFi, Bluetooth, Ethernet, and Internet, with each other and with an electronic device 101 of a user.

An electronic device 101 may also connect to the network resource devices 103 via a communications link 102. The communications link 102 may be a proximity enabled link such as a short range communications channel. For instance, NFC, BLE, and RFID may be examples of a communications link 102, according to various embodiments. For example, in an embodiment, a proximity enabled communications link like NFC may be operable to initiate a direct or indirect network connection between an NFC-enabled device (e.g., an electronic device 101) and a network resource device 103*a*, that may be a print device. For instance, an encoded NFC tag of a print device 103 may respond to a field generated by another NFC-enabled device by providing information that identifies network information about the print device, such as Bluetooth® address, IP address, MAC address, and/or the like. In this regard, the print device's NFC tag may transmit a print device identifier for receipt by, for example, an electronic device 101. An electronic device 101 may be configured to identify the print device identifier as being associated with a print device and to launch an application that may begin the process of allowing the electronic device 101 to connect with the print device 103.

The system 100 may also include a server 105 in communication with the electronic device 101 and/or the resource devices 103. The server 105 may be implemented on or as a web site, a server on a private network or local intranet, or other local or remote hardware, software, or logic. The server 105 may receive and store a print job submitted by a user, via the mobile device, until the time a user selects a print device for printing the submitted print job. The server 105 may allow a set of users to print at a number of print devices. The server 105 may provide print services for the mobile device such as formatting and rendering documents to be printed. The server 105 may also store data and associated metadata associated with a user (and/or associated mobile device) and the print devices. Alternatively and/or additionally, the server 105 may be configured to access and/or retrieve data and metadata associated with a user and the print devices from a remote server. The server may also include a mail server (not shown here).

Each of the network resource devices 103 may include a user interface (not shown here), which may be employed to select features and enter other data to, for example, the print device 103*a*. Such a user interface may include, for example, a touch screen having touch activated keys for navigating through an option menu, a keypad, an audio interface, or the like. In an embodiment, the network resource device may also include a wireless communication interface (such as a transmitter, an NFC interface, an RFID tag or a BLE receiver) used to communicate with one or more other devices. In certain embodiments, the network resource device may also include means for user authentication. The network resource, for example, may be connected to an external user authentication system, such as a smart card reader, or may be configured to include internal user identification.

In this document, the term "client application" refers to a set of programming instructions that, when executed by a processor of an electronic device, causes the electronic device to perform some or all of the guest onboarding and/or print-related functions that are described in this disclosure. A print device and/or an electronic device may have a client application pre-configured. Alternatively and/or additionally, a user of a print device and/or an electronic device may download and install a client application onto the mobile device. A user may acquire an application by downloading it from an application database, the server, and/or from a print service provider. The client application may include virtually any application type which may run on any underlying operating system or platform. The installed client application may register itself with the device operating system allowing the application to monitor certain activities on the device operating system, and to use certain functionalities of the operating system. In an embodiment, the client application may also operate to identify and customize a document to be printed on the electronic device using techniques known to those skilled in the art.

A client application may correspond to a local application which executes on an electronic device. Alternatively, a client application may represent a web application which executes on a remote application server. That is, the client application may include application functionality which is accessed by a user over a network and executed locally as an application, e.g., using a browser running on the electronic device. In other embodiments, a client application may include or have access to both local and web (remote) elements. A client application may include a database of information. In certain embodiments, the database may be exported to another local device or to a remote, cloud-based repository. Techniques for executing such a web application, and related technology, are well known in the art and are therefore not described further in detail herein, except as may be helpful or necessary to understand operations of the system.

Figure 2:
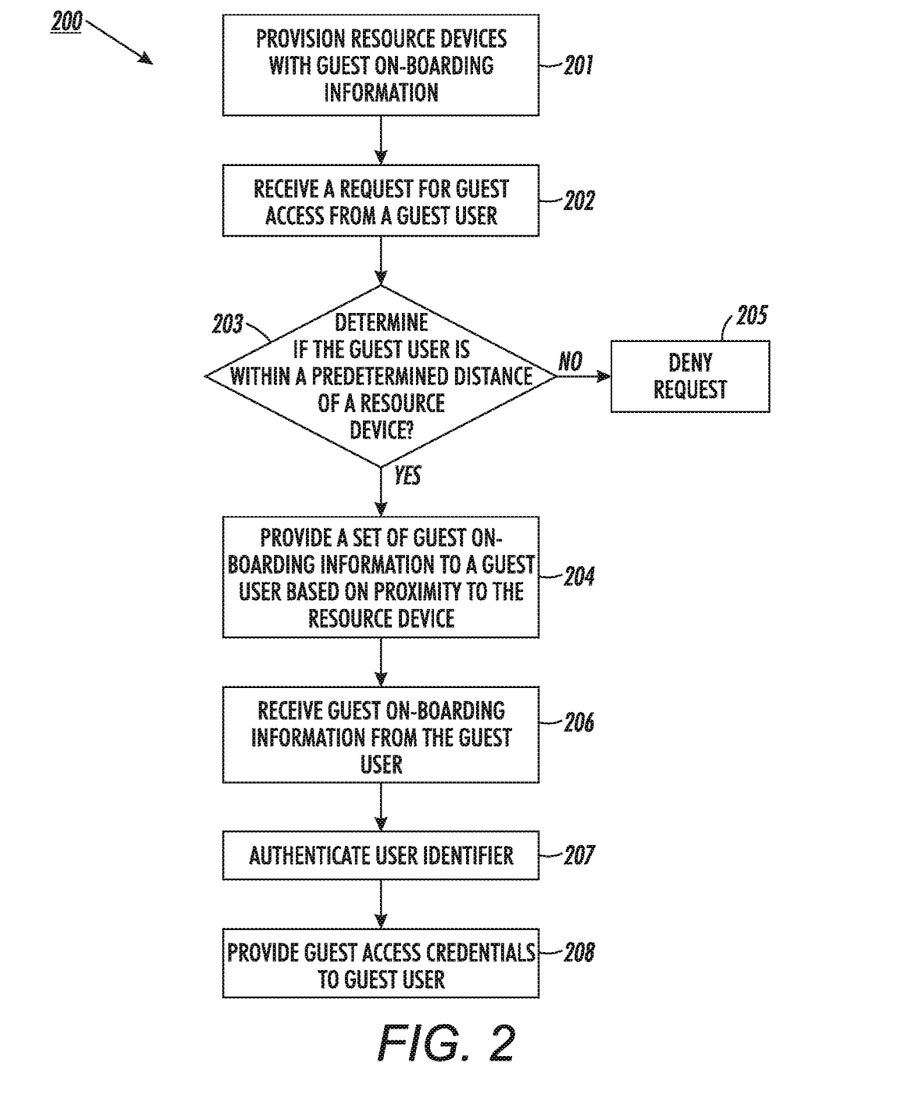
FIG. 2 depicts a flow chart of an example process for automatically providing guest access to one or more network resource devices based on proximity, according to an embodiment.

FIG. 2 depicts a flow chart of an example process for automatically providing guest access to a guest user using proximity based authentication. In step 201, a server may create and send (provision) one or more sets of guest on-boarding information to each resource device in the system. In an embodiment, each set of guest on-boarding information may include a single-use unique identifier and at least one domain address. As an example, a domain address may be an email address for a mail server of the system where a guest on-boarding request may be delivered. It will be understood to those skilled in the art that the use of an email address is only an example and other now or hereafter known types of addresses may be used.

In an embodiment, the unique identifier may be configured to include information such as policies and restrictions relating to guest user access, such as, for example resource device use policies. The policies and restrictions may be the same for all the resource devices in the system and/or may vary for some or all of the resource devices. In an embodiment, different unique identifiers may have different policies and restrictions associated with them, and a resource device may intelligently provide the guest user with an appropriate unique identifier as discussed below.

In step 202, the system may receive a request for guest access from a guest user. The system may receive the request as a user command via a user interface (such as touchscreen, keypad, audio, etc.) of a resource device of the system. Alternatively and/or additionally, the system may receive the request via an electronic device of a user (sponsor or guest). For example, the system may receive a request via a communications link between a resource device and the electronic device, via email, or via other now or hereafter known methods. At the time of the request, the guest user will not be authorized to access the resource devices (or at least the requested resource device).

Upon receipt of a request for guest access, the system may determine 203 whether the guest user is physically located within certain distance from a resource device of the system. The system may identify such resource device as a proximate device to the guest user. The certain distance will be a threshold value that may be predetermined, or that may be determined at the time of the request based on any suitable criteria (as discussed below). Optionally, a single certain distance may be used, or the certain distance may vary by resource device. The system may provide 204 to a guest user a set of guest on-boarding information only if the guest user is physically located within a certain distance from the resource device. This ensures that the guest on-boarding information is only provided to guest users who are in close proximity to a resource device. For example guest users may be allowed to use a resource device by virtue of their presence in a particular location. In an embodiment, the functionality performed by the resource device may be implemented via execution of a local application. Additionally and/or alternatively, at least some of the functionality may be performed via processing that occurred at a host processor or a server connected via a network or a cloud device. A resource device may provide a guest user the guest on-boarding information by a variety of mechanisms. Examples may include, without limitation, by displaying it on a user interface associated with the proximate device, transmitting it to a mobile device associated with the guest user, transmitting it to an electronic device associated with the guest user, or other similar techniques, each of which are discussed below in detail. A resource device may provide a guest user the guest on-boarding information "as is" and/or after encoding some or all of the guest on-boarding information using barcodes or other similar mechanisms.

The system may determine 203 that a guest user requesting on-boarding information is physically located within a certain distance of a resource device based on one or more mechanisms. For example, in an embodiment, a resource device may present a set of information on a user interface of the resource device such as a display of the resource device, such that a guest user may only be able to receive the presented set of information when the guest user is within a threshold reading distance of the user interface or otherwise in close proximity of the resource device. Alternatively and/or additionally, a guest user may receive the presented set of information by imaging it using a mobile device when the guest user is within an imaging radius of the user interface of the resource device. For example, a resource device may encode the set of information in a barcode and present it on a user interface, and a guest user may capture an image of the barcode to receive the presented information only when the guest user is physically located within an imaging distance of the user interface. The presented set of information may include, for example, instructions for the guest user to perform a task, text, and/or the guest on-boarding information itself. The system may then determine that a guest user is physically located within the requisite certain distance (and identify the resource device as a proximate device) if after the guest user has received (by reading or imaging) the presented information, the guest user performs the task correctly, verifies the text, and/or accurately receives the guest on-boarding information itself.

In another embodiment, the system may require a guest user to provide certain commands to a resource device using the resource device user interface (such as a touchpad, keypad, etc.) to receive the guest on-boarding information. The system may thus determine that a guest user is within a threshold distance of a resource device if the guest user can interact with the resource device user interface (i.e., the system may identify the resource device as a proximate device). The resource device may then provide the guest user with the guest on-boarding information via a user interface associated with the resource device (as discussed above). Alternatively and/or additionally, a guest user may provide a resource device with an email address, IP address and/or other identifying information for a guest user's electronic device, and the resource device may use such identifying information to transmit the guest on-boarding information to the electronic device. Here, the resource device ensures physical proximity of the guest user based on the guest user's interaction with the resource device for providing the required commands.

In yet another embodiment, a resource device may only provide a guest user with guest on-boarding information upon establishment of short range communications link (such as via NFC, BLE or RFID) with a guest user's mobile device. The system may determine that a guest user is within a threshold distance of a resource device if a short range communications link is successfully established between the resource device and the guest user's mobile device (i.e., the system may identify the resource device as a proximate device). The resource device may be configured to enable short range communication with a variety of devices such as NFC/BLE/RFID enabled mobile devices and/or NFC/BLE/RFID tags. Short range communication protocols require close proximity of no more than a few inches, or in some cases no more than one or two feet, to establish a communications link. Hence, the operation of establishing a link with another device may be referred to as a "tap." The term "tap" as used herein does not necessarily refer to physical contact between communicating devices, but rather positioning the devices in sufficiently close proximity to establish a short range communications link. A short range communications link may be used to send and/or receive data from a resource device. Furthermore, because of the short range nature of a short range communications link, this mechanism ensures close proximity of a guest user to a resource device, avoids cross-talk from other nearby devices, manages access, improves security, and has low power requirements. A short range communications link may also be configured to cause a resource device and/or a guest user's mobile device to perform certain processing actions, such as launching applications, transmitting (or receiving) guest on-boarding information, navigating to a particular website, and/or downloading a particular file. Optionally, a short range communications link may act as an initiation handshake to ensure close proximity of the guest user with the resource device and to transmit authentication information, network information, IP address information, and/or the like.

In another embodiment, the system may determine that a guest user is physically located within a certain distance of a resource device if the signal strength of a short range communications link between the resource device and a mobile device of the guest user is above a certain threshold. In an embodiment, a receiver and/or a transmitter of a resource device may determine the signal strength of the short range communications link. In certain embodiments, the system may detect a level of proximity between a resource device and a guest user based on the signal strength of a short range communications link between the resource device and a mobile device of the guest user. The system may use the level of proximity to determine the guest access level to be assigned to the guest user.

In an embodiment, the system may provide 204 a set of the guest on-boarding information to a guest user over an established short range communications link (as discussed above). In other embodiments, a resource device may transmit guest on-boarding information to a guest user via other means such by displaying on a user interface of a resource device, transmission to a user electronic device and/or mobile device via a secondary communications link established using information exchanged over the short range communications link, email, website link, and other now or hereafter known techniques. In various embodiments, a secondary communications link may be able to exchange communicate information over a larger distance than a short range communications link.

In an embodiment, a resource device may use a rule set to intelligently provide a guest user with guest on-boarding information that has a unique identifier associated with policies and restrictions that correspond to the guest access level that a guest user may be assigned. For example, the system may determine the access level for a guest user based upon the location of a resource device to which a guest user is determined to be in close proximity, the type of the resource device used to provide the guest on-boarding information, intended use of the resource devices by a guest user (the guest user may provide this via the user interface of a resource device), the type of mechanism used to determine proximity of a guest user to a resource device (various mechanisms discussed above), a signal strength of the short range communications link, and other similar methods.

In an embodiment, the system may also seek approval from a network administrator and/or a registered user before providing the guest on-boarding information to a guest user (in addition to determining proximity of the guest user to a resource device), to provide an additional layer of security. For example, the system may require an already existing registered user to provide the approval using an already authorized user account. Additionally and/or optionally, the system may send a notification, such as via an automated email, to a network administrator once it establishes that a guest user requesting access is within a predetermined distance of a network device. The system may only provide the guest on-boarding information to the guest user once the network administrator approves the request.

If the system determines 203 that a guest user is not within a certain distance of a resource device, the system may deny 205 the request for guest access.

In step 206, the system may receive the guest on-boarding information (including the unique identifier) from a guest user at the specified email address (i.e., the mail server) with a request for guest access. In an embodiment, a guest user may manually send a request for guest access including guest on-boarding information to the system (for example, when the user received the information by reading from a user interface of the resource device). Alternatively and/or additionally, an electronic device of a guest user that received the guest on-boarding information from a resource device (such as via email, imaging device, or short range communications link) may automatically parse the received guest on-boarding information, and transmit it to the system at the specified email address.

The system may then authenticate 207 the received unique identifier by matching it to a previously provisioned unique identifier, and provide 208 guest access credentials to the guest user in response to successfully authenticating the unique identifier. The system may perform the matching by any now or hereafter known techniques.

The system may provide guest access credentials by first creating a guest user account for a guest user. In an embodiment, the system may use the guest access level and associated policies and restrictions (if any) extracted from the unique identifier in guest on-boarding information. The policies and restrictions may include, without limitation, lifetime of guest access, identity and/or type of resource devices that a guest user may use, number of document processing jobs allowed, capabilities (number of pages allowed for printing, print capabilities like color, duplex etc., and other such capabilities), or other similar parameters. The system may also use additional rule sets that may define guest access policies and/or limitations.

In an embodiment, a resource device may transmit the time of transmission of guest on-boarding information (including the unique identifier) to the server, such that the system may disregard guest access requests including the unique identifier that are received after a certain amount of time from the time of transmission.

In an embodiment, the guest access credentials may include some or all of the information that a guest user may need to submit a document processing job (such as print job) to a resource device. Examples may include, without limitation, a username and password to access a resource device (or to connect to the resource network via a server), list of resource devices on a network and related resource device information (such as location, configuration, and capabilities), submission protocols (such as email address, and short range communications), and appropriate device driver information (such as information for downloading a print client on a guest user's electronic device).

The system may provide guest access credentials to a guest user using any now or hereafter known methods such as via email, a browser link, via a short range communications link with a resource device, and/or the like.

A guest user may use the guest access credentials to directly or indirectly access and connect to a resource device and submit a desired document processing job. Alternatively and/or additionally, a guest user may simply connect to a server of the system using the guest access credentials and submit a document processing job to the server. The server may then release the document processing job to a network resource device of the guest user's choice using techniques known to those skilled in the art. For example, the system may provide a confirmation number to a guest user upon receipt of a document processing job, and may release the document processing job to a resource device when the guest user provides the confirmation number at the resource device (pull printing). In an embodiment, the server may pre-render the document into a format compatible with the selected resource device.

Figure 3:
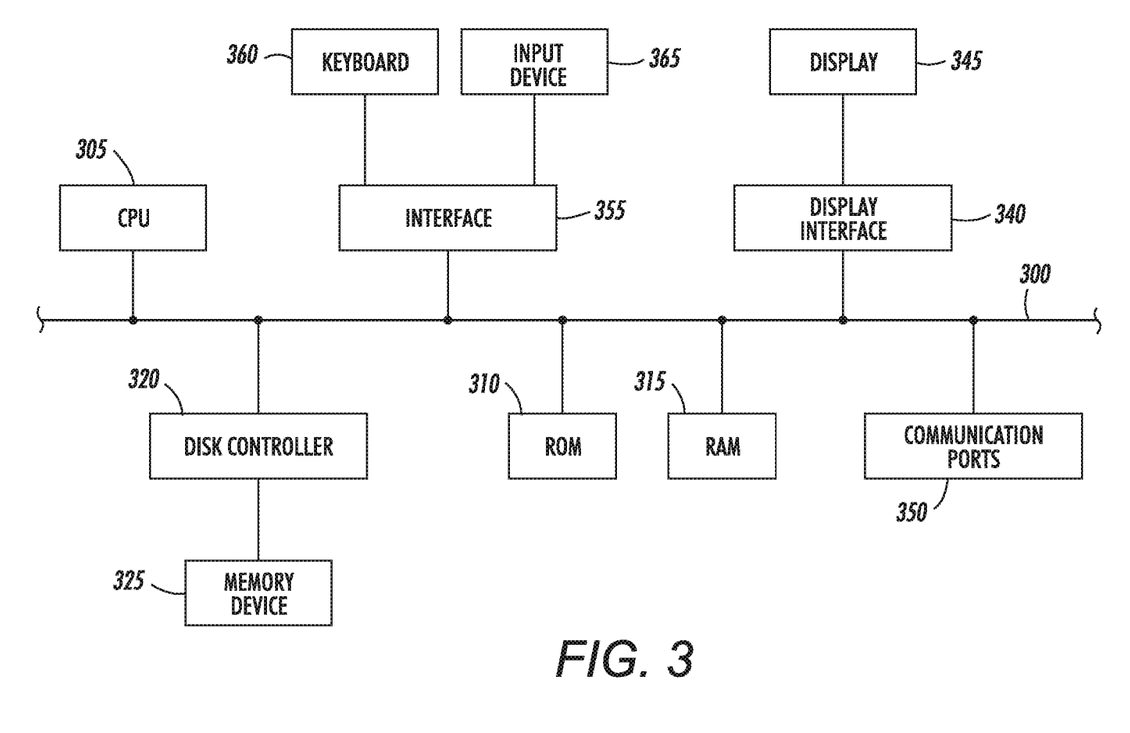
FIG. 3 depicts a block diagram of example hardware that may be used to contain or implement program instructions, according to an embodiment.

The guest on-boarding method and process as described above may be performed and implemented by an operator of an electronic device and/or a resource device. FIG. 3 depicts an example of internal hardware that may be used to contain or implement the various computer processes and systems as discussed above. For example, a mobile electronic device, such as that discussed throughout, may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 310 and random access memory (RAM) 315 constitute examples of memory devices. The term "memory device" and similar terms include single device embodiments, multiple devices that together store programming or data, or individual sectors of such devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

An optional display interface 340 may permit information from the bus 300 to be displayed on the display 345 in audio, visual, graphic or alphanumeric format. Communication with external devices may occur using various communication ports 350. A communication port 350 may be attached to a communications network, such as the Internet, a local area network or a cellular telephone data network. The communication ports may also include short range communications interfaces such as NFC, BLE, or RFID interfaces.

The hardware may also include an interface 355 which allows for receipt of data from input devices such as an imaging sensor 360 of a scanner or other input device 365 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for providing guest access credentials to a guest user for a network resource device based on proximity comprising:
    a plurality of network resource devices;
    a hardware processor in communication with the plurality of network resource devices; and
    a non-transitory computer-readable medium containing programming instructions that, when executed by the hardware processor, cause the hardware processor to:
        provision each of the plurality of network resource devices with at least one set of guest-on boarding information, wherein the at least one set of guest on-boarding information comprises a unique identifier and a domain address,
        receive a request for guest access from a guest user for one or more of the plurality of network resource devices, wherein the guest user does not have access to the one or more of the plurality of network resource devices at a time of the request,
        determine if the guest user is within a certain distance of at least one of the plurality of network resource devices, and if the guest user is within the certain distance of at least one of the plurality of network resource devices identify each such network resource device as a proximate device,
        provide a first set of guest on-boarding information, via at least one of the proximate devices, to the guest user, wherein:
            the first set of guest on-boarding information comprises a first unique identifier, and
            the first unique identifier comprises information relating to a time of transmission of the first set of guest on-boarding information to the guest user,
        receive the first unique identifier from the guest user,
        extract the time of transmission of the first set of guest on-boarding information to the guest user, from the first unique identifier received from the guest user,
        determine a time difference between the time of transmission of the first set of guest on-boarding information to the guest user and a time of receipt of the first unique identifier received from the guest user,
        determine whether the time difference is greater than a threshold value, and
        upon determining that the time difference is not greater than the threshold value, provide guest access credentials to the guest user.

2. The system of claim 1, wherein at least one of the plurality of network resource devices is a print device.

3. The system of claim 2, further comprising programming instructions, that when executed by the hardware processor, cause the hardware processor to:
    receive the guest access credentials from the guest user;
    provide guest access to the guest user for one of the proximate devices that is also a print device;
    receive a print document from the guest user; and
    release the print document for printing at the proximate device that is also a print device.

4. The system of claim 1, wherein the programming instructions that, when executed by the hardware processor, cause the hardware processor to determine if the guest user is within a certain distance of at least one of the plurality of network resource devices comprise programming instructions that when executed cause the hardware processor to:
    establish a short range communications link between an electronic device of the guest user and the at least one network resource device; and
    determine if a signal strength of the short range communications link is above a threshold level, and if the signal strength is above the threshold level determine that the guest user is within the certain distance of at least one of the network resource devices.

5. The system of claim 4, wherein the short range communications link comprises a near-field communications link, a Bluetooth Low Energy link, or a radio-frequency identification link.

6. The system of claim 1, wherein the programming instructions that, when executed by the hardware processor, cause the hardware processor to determine if the guest user is within a certain distance of at least one of the plurality of network resource devices comprise programming instructions that when executed cause the hardware processor to:
    display information on a display interface of the at least one network resource device, wherein the information comprises a set of instructions for the guest user to perform a task, and
    determine that the guest user is within the certain distance of the at least one network resource device if the guest user accurately performs the task.

7. The system of claim 6, wherein the set of instructions comprises the first set of guest on-boarding information.

8. The system of claim 1, wherein the programming instructions that, when executed by the hardware processor, cause the hardware processor to determine if the guest user is within a certain distance of at least one of the plurality of network resource devices comprise programming instructions that when executed cause the hardware processor to determine if the request for guest access from the guest user was received via a user interface of the at least one network resource device, wherein use of the user interface requires physical proximity of the guest user.

9. The system of claim 1, wherein:
the first unique identifier comprises information relating to a guest access policy; and
wherein the programming instructions that, when executed by the hardware processor, cause the processor to provide guest access credentials to the guest user comprise programming instructions that when executed cause the hardware processor to configure the guest access credentials based on the guest access policy.

10. The system of claim 9, wherein the guest access policy comprises one or more of the following:
a lifetime of the guest access credentials;
a maximum number of document processing jobs allowed;
one or more types of the network resource devices that the guest user can access;
identities of the network resource devices that the guest user may be authorized access; or
one or more capabilities of the network resource devices that the guest user may be authorized to access.

11. The system of claim 1, wherein
the computer readable storage medium further comprises programming instructions that when executed by the hardware processor cause the hardware processor to:
upon determining that the time difference is greater than the threshold value, deny the request for guest access to the one or more of the plurality of network resource devices.

12. The system of claim 1, wherein the computer-readable storage medium further comprises programming instructions that, when executed by the hardware processor, cause the hardware processor to authenticate the first unique identifier received from the guest user by determining that the first unique identifier matches a unique identifier provisioned to the plurality of resource devices.

13. The system of claim 1, wherein:
the first set of guest on-boarding information further comprises a domain address; and
the first unique identifier is received by the processor at the domain address.

14. The system of claim 1, wherein the programming instructions that, when executed by the hardware processor, cause the hardware processor to receive a request for guest access from a guest user for one or more of the plurality of network resource devices comprise programming instructions that when executed cause the hardware processor to receive the request for guest access from an electronic device of the guest user.

15. The system of claim 1, wherein the programming instructions that, when executed by the hardware processor, cause the hardware processor to provide guest access credentials to the guest user comprise programming instructions that when executed cause the hardware processor to provide guest access credentials to an electronic device of the guest user.

16. A method for providing guest access credentials to a guest user for a network resource device based on proximity comprising, by a hardware processor:
provisioning each of a plurality of network resource devices with at least one set of guest-on boarding information, wherein the at least one set of guest on-boarding information comprises a unique identifier and a domain address;
receiving a request for guest access from a guest user for one or more of the plurality of network resource devices, wherein the guest user does not have access to the one or more of the plurality of network resource devices at a time of the request;
determining if the guest user is within a certain distance of at least one of the plurality of network resource devices, and if the guest user is within the certain distance of at least one of the plurality of network resource devices identify each such network resource device as a proximate device;
providing a first set of guest on-boarding information, via at least one of the proximate devices, to the guest user, wherein:
the first set of guest on-boarding information comprises a first unique identifier, and
the first unique identifier comprises information relating to a time of transmission of the first set of guest on-boarding information to the guest user;
receiving the first unique identifier from the guest user;
extracting the time of transmission of the first set of guest on-boarding information to the guest user, from the first unique identifier received from the guest user,
determining a time difference between the time of transmission of the first set of guest on-boarding information to the guest user and a time of receipt of the first unique identifier received from the guest user;
determining whether the time difference is greater than a threshold value; and
upon determining that the time difference is not greater than the threshold value, providing guest access credentials to the guest user.

17. The method of claim 16, wherein at least one of the plurality of network resource devices is a print device.

18. The method of claim 17, further comprising, by the hardware processor:
receiving the guest access credentials from the guest user;
providing guest access to the guest user for one of the proximate devices that is also a print device;
receiving a print document from the guest user; and
releasing the print document for printing at the proximate device that is also a print device.

19. The method of claim 16, wherein determining the guest user is within a certain distance of at least one of the plurality of network resource devices comprises:
establishing a short range communications link between an electronic device of the guest user and the at least one network resource device; and
determining if a signal strength of the short range communications link is above a threshold level, and if the signal strength is above the threshold level determining that the guest user is within the certain distance of at least one of the network resource devices.

20. The method of claim 19, wherein the short range communications link comprises a near-field communications link, a Bluetooth Low Energy link, or a radio-frequency identification link.

21. The method of claim 16, determining if the guest user is within a certain distance of at least one of the plurality of network resource devices comprises:
  displaying information on a display interface of the at least one network resource device, wherein the information comprises a set of instructions for the guest user to perform a task, and
  determining that the guest user is within the certain distance of the at least one network resource device if the guest user accurately performs the task.

22. The method of claim 21, wherein the set of instructions comprises the first set of guest on-boarding information.

23. The method of claim 16, wherein determining if the guest user is within a certain distance of at least one of the plurality of network resource devices comprises determining if the request for guest access from the guest user was received via a user interface of the at least one network resource device, wherein use of the user interface requires physical proximity of the guest user.

24. The method of claim 16, wherein:
  the first unique identifier comprises information relating to a guest access policy; and
  wherein providing guest access credentials to the guest user comprises configuring the guest access credentials based on the guest access policy.

25. The method of claim 24, wherein the guest access policy comprises one or more of the following:
  a lifetime of the guest access credentials;
  a maximum number of document processing jobs allowed;
  one or more types of the network resource devices that the guest user can access;
  identities of the network resource devices that the guest user may be authorized access; or
  one or more capabilities of the network resource devices that the guest user may be authorized to access.

26. The method of claim 16, wherein
  the method further comprises, by the processor:
    upon determining that the time difference is greater than the threshold value, denying the request for guest access to the one or more of the plurality of network resource devices.

27. The method of claim 16, further comprising authenticating the first unique identifier received from the guest user by determining that the first unique identifier matches a unique identifier provisioned to the plurality of resource devices.

28. The method of claim 16, wherein:
  the first set of guest on-boarding information further comprises a domain address; and
  the first unique identifier is received by the processor at the domain address.

* * * * *